US012785140B2

(12) United States Patent
Iwasaki et al.

(10) Patent No.: US 12,785,140 B2
(45) Date of Patent: Nov. 3, 2026

(54) ELECTRODE FOR ALL-SOLID STATE BATTERY

(71) Applicants: TOYOTA JIDOSHA KABUSHIKI KAISHA, Toyota (JP); Panasonic Holdings Corporation, Kadoma (JP)

(72) Inventors: Masahiro Iwasaki, Nagoya (JP); Kazuya Hashimoto, Miyoshi (JP); Izuru Sasaki, Kyoto (JP); Yuta Sugimoto, Nishinomiya (JP)

(73) Assignees: TOYOTA JIDOSHA KABUSHIKI KAISHA, Toyota (JP); Panasonic Holdings Corporation, Kadoma (JP)

( * ) Notice: Subject to any disclaimer, the term of this patent is extended or adjusted under 35 U.S.C. 154(b) by 679 days.

(21) Appl. No.: 18/205,747

(22) Filed: Jun. 5, 2023

(65) Prior Publication Data

US 2024/0030487 A1 Jan. 25, 2024

(30) Foreign Application Priority Data

Jul. 22, 2022 (JP) ................................ 2022-116808

(51) Int. Cl.
*H01M 10/0562* (2010.01)

(52) U.S. Cl.
CPC .. *H01M 10/0562* (2013.01); *H01M 2300/008* (2013.01)

(58) Field of Classification Search
CPC ................................................ H01M 10/0562
See application file for complete search history.

(56) References Cited

U.S. PATENT DOCUMENTS

| | | | | |
|---|---|---|---|---|
| 2022/0416296 | A1 | 12/2022 | Nakama et al. | |
| 2023/0009296 | A1 | 1/2023 | Sakaida et al. | |
| 2023/0411601 | A1* | 12/2023 | Choi | H01M 4/139 |

FOREIGN PATENT DOCUMENTS

| | | | | | |
|---|---|---|---|---|---|
| CN | 113544878 | A | * 10/2021 | | H01M 10/0568 |
| JP | 2020161364 | A | * 10/2020 | | |
| WO | 2021/186809 | A1 | 9/2021 | | |
| WO | 2021/187391 | A1 | 9/2021 | | |

OTHER PUBLICATIONS

JP-2020161364-Atranslation (Year: 2020).*
CN-113544878-Atranslation (Year: 2021).*
U.S. Appl. No. 17/976,456, filed Oct. 28, 2022; Inventors: Akio Mitsui et al.

* cited by examiner

*Primary Examiner* — Brian R Ohara
(74) *Attorney, Agent, or Firm* — Sughrue Mion, PLLC

(57) ABSTRACT

An electrode for an all-solid state battery contains composite particles of 100 parts by mass and an imidazoline-based compound of more than 0 parts by mass and 0.3 parts by mass or less. The composite particle includes a core particle and a coating layer. The coating layer covers at least a part of a surface of the core particle. The core particle contains an active material. The coating layer contains a fluoride solid electrolyte.

7 Claims, 1 Drawing Sheet

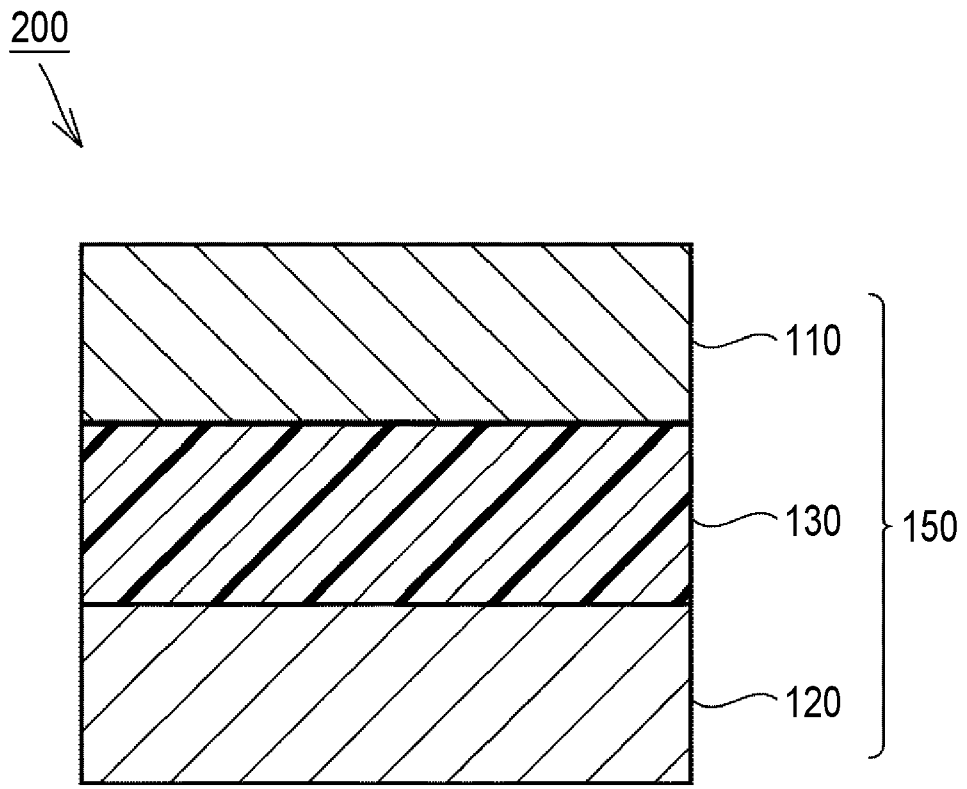
200
110
130
120
150

ELECTRODE FOR ALL-SOLID STATE BATTERY

CROSS-REFERENCE TO RELATED APPLICATION

This application claims priority to Japanese Patent Application No. 2022-116808 filed on Jul. 22, 2022 incorporated herein by reference in its entirety.

BACKGROUND

1. Technical Field

The present disclosure relates to an electrode for an all-solid state battery.

2. Description of Related Art

Japanese Unexamined Patent Application Publication No. 2020-161364 (JP 2020-161364 A) discloses adding a dispersing agent to a composition for forming a solid electrolyte layer.

SUMMARY

It has been needed to suppress an increase in resistance associated with long-term use. The present disclosure reduces the resistance increase rate.

An electrode for an all-solid state battery (hereinafter may be abbreviated as "electrode") according to a first aspect of the present disclosure includes composite particles of 100 parts by mass and an imidazoline-based compound (hereinafter may be abbreviated as "IM compound") of more than 0 parts by mass and 0.3 parts by mass or less. The composite particle includes a core particle and a coating layer. The coating layer covers at least a part of the surface of the core particle. The core particle contains an active material. The coating layer contains a fluoride solid electrolyte.

According to the novel findings of the present disclosure, the dispersibility of an active material in an electrode can affect the resistance increase associated with long-term use. The active material repeatedly expands and contracts during long-term use. The active material is a group of particles. The group of particles may not disperse, and thus the group of particles may form an aggregate. In the aggregate, the volume changes of individual particles can accumulate. This can amplify the volume change of the aggregate. There is a possibility that a surrounding ion conduction path cannot respond to a large volume change of the aggregate, which results in a break in the ion conduction path. It is conceived that the break in the ion conduction path accelerates the increase in resistance.

Hereinafter, a solid electrolyte may be abbreviated as "SE". For example, the fluoride solid electrolyte may be abbreviated as a "fluoride SE". In the manufacturing process (in the slurry state) of the electrode, the IM compound can act as a dispersing agent for SE. According to the novel findings of the present disclosure, the IM compound can impart high dispersibility, in particular, to the fluoride SE. The composite particle is covered by the fluoride SE. As a result, the composite particles hardly aggregate and can be well dispersed in the electrode. That is, the active material hardly aggregates and can be well dispersed in the electrode. In addition, the fluoride SE tends to have a small increase in reaction resistance associated with long-term use as compared with, for example, an oxide SE ($LiNbO_3$ or the like). A synergistic effect of these actions is expected to reduce the resistance increase rate.

However, in a case where the blending amount of the IM compound is excessive, the resistance increase rate may rather increase. This is conceived to be because the IM compound has insulating properties. For this reason, the blending amount of the IM compound has an upper limit value (0.3 parts by mass).

In the first aspect of the present disclosure, the electrode may contain, for example, composite particles of 100 parts by mass and the imidazoline-based compound of 0.05 parts by mass to 0.1 parts by mass. This is because a reduction in resistance increase rate is expected. It is noted that unless otherwise specified, a numerical range of "M to N" includes the upper limit value and the lower limit value. For example, "0.05 parts by mass to 0.1 parts by mass" indicates 0.05 parts by mass or more and 0.1 parts by mass or less.

In the first aspect of the present disclosure, the electrode may further contain, for example, a sulfide solid electrolyte of 10 parts by mass to 100 parts by mass. The sulfide SE can form an ion conduction path in the electrode. The sulfide SE can exhibit high ion conductivity.

In the first aspect of the present disclosure, the imidazoline-based compound may be represented, for example, by Formula (1).

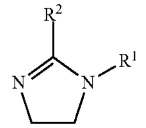

(1)

In Formula (1), $R^1$ is an alkyl group or a hydroxyalkyl group and has 1 to 22 carbon atoms. $R^2$ is an alkyl group or an alkenyl group and has 10 to 22 carbon atoms. The IM compound represented by Formula (1) can impart high dispersibility to the fluoride SE.

In the first aspect of the present disclosure, the fluoride solid electrolyte may be represented, for example, by Formula (2).

$$Li_{3-x}Ti_xAl_{1-x}F_6 \quad (2)$$

In Formula (2), x satisfies $0 \le x \le 1$. The fluoride SE represented by Formula (2) tends to have a small increase in reaction resistance associated with long-term use.

In the first aspect of the present disclosure, the ratio of the specific surface area of the composite particle to the specific surface area of the core particle may be more than 1.07 and 3.27 or less. This is because an increase in the action of the IM compound is expected.

Hereinafter, embodiments of the present disclosure (which may be abbreviated as "the present embodiments" below) and examples of the present disclosure (which may be abbreviated as "the present examples" below) will be described. However, the present embodiments and the present examples do not limit the technical scope of the present disclosure. The present embodiments and the present examples are illustrative in all respects. The present embodiments and the present examples are non-restrictive. The technical scope of the present disclosure includes all changes within the meaning and the scope that are equivalent to the description of CLAIMS.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a conceptual view of an all-solid state battery according to the present embodiment.

DETAILED DESCRIPTION OF EMBODIMENTS

All-solid State Battery

FIG. 1 is a conceptual view of an all-solid state battery according to the present embodiment. An all-solid state battery 200 includes a power generation element 150. The all-solid state battery 200 may include, for example, an exterior body (not illustrated in the drawing). The exterior body may house the power generation element 150. The exterior body may be, for example, a pouch or the like made of a metal foil laminated film or may be a case or the like made of a metal. The all-solid state battery 200 may include one power generation element 150 alone or may include a plurality of power generation elements 150. The power generation elements 150 may form, for example, a series circuit or a parallel circuit.

The power generation element 150 includes a first electrode 110, a separator layer 130, and a second electrode 120. The separator layer 130 is interposed between the first electrode 110 and the second electrode 120. The separator layer 130 separates the first electrode 110 from the second electrode 120. The separator layer 130 may contain, for example, the sulfide SE (described later). The separator layer 130 may have a thickness of, for example, 1 μm to 100 μm.

The second electrode 120 has a polarity different from that of the first electrode 110. For example, in a case where the first electrode 110 is a positive electrode, the second electrode 120 is a negative electrode. At least one of the first electrode 110 and the second electrode 120 includes composite particles and the IM compound. Hereinafter, the first electrode 110 and the second electrode 120 may be collectively referred to as the "electrode".

Electrode

The electrode includes an active material layer. The electrode may further include, for example, a base material. For example, an active material layer may be disposed on the surface of the base material. The base material may have, for example, a sheet shape. The base material may include, for example, an Al foil, a Cu foil, an Ni foil, or the like. The base material may have a thickness of, for example, 5 μm to 50 μm.

The active material layer may have a thickness of, for example, 10 μm to 1,000 μm. The active material layer contains composite particles and the IM compound. That is, the electrode contains composite particles and the IM compound. The active material layer may further contain an auxiliary material. The auxiliary material may include, for example, at least one selected from the group consisting of an ion conductive material, an electron conductive material, and a binder.

Imidazoline-Based Compound

The IM compound can impart high dispersibility to the fluoride SE. That is, the IM compound can impart high dispersibility to the composite particles. The IM compound has an imidazoline skeleton. The imidazoline skeleton includes a nitrogen-containing heterocyclic structure. The imidazoline skeleton can be derived from imidazole. The IM compound may be represented, for example, by Formula (1).

(1)

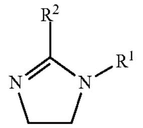

In Formula (1), $R^1$ may be, for example, an alkyl group or a hydroxyalkyl group. $R^1$ may have, for example, 1 to 22 carbon atoms. In the hydroxyalkyl group, the hydroxyl group may be bonded, for example, to the terminal carbon atom opposite to the carbon atom bonded to a nitrogen atom (N). $R^2$ may be, for example, an alkyl group or an alkenyl group. $R^2$ may have, for example, 10 to 22 carbon atoms. In the alkenyl group, the position and number of double bonds may be any position and any number, respectively.

The IM compound may include, for example, a 1-hydroxyethyl-2-alkenyl imidazoline. The active material layer may contain one kind of imidazoline-based compound alone or may contain two or more kinds of imidazoline-based compounds. For example, "DISPERBYK (registered trade name)—109" manufactured by BYK Additives & Instruments contains a 1-hydroxyethyl-2-alkenyl imidazoline.

The blending amount of the IM compound is more than 0 parts by mass and parts by mass or less with respect to 100 parts by mass of the composite particles. In a case where the blending amount of the IM compound exceeds 0.3 parts by mass, the resistance increase rate may rather increase. The blending amount of the IM compound may be, for example, 0.05 parts by mass to 0.103 parts by mass, 0.05 parts by mass to 0.1 parts by mass, or 0.103 parts by mass to 0.2 parts by mass with respect to 100 parts by mass of the composite particles. In a case where the blending amount of the IM compound is 0.05 parts by mass to 0.1 parts by mass with respect to 100 parts by mass of the composite particles, the resistance increase rate tends to be low.

Composite Particle

The composite particle includes a core particle and a coating layer. The D50 of the composite particle may be, for example, 1 μm to 30 μm. "D50" indicates the particle diameter at which the cumulative frequency of particles from the smaller size reaches 50% in the volume-based particle size distribution. D50 can be measured with a laser diffraction particle size distribution measuring apparatus. The composite particle can have any shape. The composite particle may have, for example, a spherical shape, an ellipsoidal shape, a flake shape, or a columnar shape. It is noted that the "particle" is sometimes used to mean a group of particles or a powder.

Coating Layer

The coating layer covers at least a part of the surface of the core particle. The coating layer may cover the entire surface of the core particle. The coating layer may cover a part of the surface of the core particle. The thickness of the coating layer may be, for example, 5 nm to 50 nm.

The coating layer contains the fluoride SE. The fluoride SE may contain, for example, Li and F. The fluoride SE may contain, for example, at least one selected from the group consisting of Ca, Mg, Al, Y, Ti, and Zr.

The fluoride SE may be represented, for example, by Formula (2).

$$Li_{3-x}Ti_xAl_{1-x}F_6 \quad (2)$$

In Formula (2), x satisfies $0 \le x \le 1$. x may satisfy, for example, $0.2 \le x \le 0.8$, $0.3 \le x \le 0.7$, or $0.4 \le x \le 0.6$.

Core Particle

The core particle is a base material of the composite particle. The composite particle may include one core particle alone. The composite particle may include a plurality of core particles. The core particle may be, for example, a secondary particle. The secondary particle is an aggregate of primary particles. The D50 of the secondary particle may be, for example, 1 μm to 30 μm. The average Feret's diameter of the primary particles may be, for example, 0.01 μm to 3 μm. The core particle can have any shape. The core particle may have, for example, a spherical shape, an ellipsoidal shape, a flake shape, or a columnar shape.

The core particle contains an active material. The core particle may contain a positive electrode active material. That is, the electrode may be a positive electrode. The positive electrode active material may include, for example, at least one selected from the group consisting of $LiCoO_2$, $LiNiO_2$, $LiMnO_2$, $LiMn_2O_4$, $Li(NiCoMn)O_2$, $Li(NiCoA_1)O_2$, $Li(NiCoMnA_1)O_2$, and $LiFePO_4$. For example, "(NiCoMn)" in "$Li(NiCoMn)O_2$" indicates that the sum of the compositional ratios in parentheses is one. The amounts of individual components may be any amount as long as the sum is one.

The positive electrode active material may be represented, for example, by Formula (3).

$$Li_{1-y}Ni_xM_{1-x}O_2 \quad (3)$$

$$0.5 \le x \le 1, -0.5 \le y \le 0.5$$

In Formula (3), M may include, for example, at least one selected from the group consisting of Co, Mn, and Al. x may be, for example, 0.6 or more, may be 0.7 or more, may be 0.8 or more, or may be 0.9 or more.

The core particles may contain a negative electrode active material. That is, the electrode may be a negative electrode. The negative electrode active material may contain, for example, at least one selected from the group consisting of natural graphite, artificial graphite, soft carbon, hard carbon, Si, $SiO_x$ ($0<x<2$), an Si-based alloy, Sn, $SnO_x$ ($0<x<2$), Li, a Li-based alloy, and $Li_4Ti_5O_{12}$.

Method of Forming Composite Particle

The composite particle can be formed by any method. The composite particle may be formed, for example, by applying at least one kind of mechanical energy selected from the group consisting of impact, compression, and shear to an object to be treated (a mixture of the active material and the fluoride SE). For example, "Nobilta" (manufactured by Hosokawa Micron Corporation) or "BALANCE GRAN" (manufactured by FREUND-TURBO CORPORATION) is conceivable as an apparatus that enables the composite treatment.

"Nobilta" is equipped with a cylindrical casing (container) and a rotor. The rotation axis of the rotor coincides with the central axis of the casing. In a case where the rotor rotates at a high speed within the casing, the energy due to impact, compression, and shear can be applied to an object to be treated, in the gap (clearance) between the inner wall of the casing and the rotor.

"BALANCE GRAN" is equipped with a chopper and an agitator scraper. The chopper is disposed coaxially with the agitator scraper. The chopper accelerates stirring and convection. The stirring and the convection by the chopper are generated spirally from the outer peripheral side. The agitator scraper rotates in the opposite direction to the chopper. The chopper can apply energy to an object to be treated, primarily through shear.

BET Ratio

The composite particle may be formed such that, for example, the specific surface area is increased compared with the active material (the core particle). The "ratio of the specific surface area of the composite particle to the specific surface area of the core particle" is abbreviated as the "BET ratio". The BET ratio may be, for example, 1.07 to 3.27, 1.16 to 3.27, 1.20 to 3.27, 1.50 to 3.00, 1.79 to 3.00, or 1.80 to 2.50. As the BET ratio becomes large, the action of the IM compound tends to increase. That is, in a case where the BET ratio is large, a large dispersion effect can be expected with a small adding amount of the IM compound. The reduction of the IM compound is expected to reduce, for example, initial resistance. For example, the BET ratio tends to become large in the treatment by Balance Gran as compared with a case in the treatment by Nobilta.

The "specific surface area" indicates the surface area per unit mass. The specific surface area can be measured with a specific surface area measuring apparatus. For example, a specific surface area and pore distribution measuring apparatus "BELSORPMINI" (product name) manufactured by MicrotracBEL Corp. (or an equivalent product) may be used. The measurement procedure is, for example, as follows. First, 3 g of a measurement sample (powder) is placed in a test tube for measurement. The test tube for measurement is set in a specific surface area measuring apparatus. An adsorption isotherm is acquired by carrying out a nitrogen gas adsorption test in the specific surface area measuring apparatus. In the nitrogen gas adsorption test, the adsorption temperature is 77 K, and the upper limit of the adsorption relative pressure is 0.99 (P/P0). The specific surface area is determined by analyzing the linear region of the adsorption isotherm according to the BET method. The adsorption isotherm may be analyzed by analysis software (for example, "BELMaster 7" (product name)). The specific surface area of the composite particle may be, for example, 0.5 $m^2/g$ to 2 $m^2/g$.

Ion Conductive Material

The ion conductive material can form an ion conduction path within the active material layer. The ion conductive material may have a shape of, for example, a particle. The ion conductive material may have a D50 of, for example, 0.1 μm to 1 μm. The blending amount of the ion conductive material may be, for example, 10 parts by mass to 100 parts by mass with respect to 100 parts by mass of the composite particles.

The ion conductive material may contain, for example, the sulfide SE or the like. The electrode may contain, for example, 10 parts by mass to 100 parts by mass of the sulfide SE with respect to 100 parts by mass of the composite particles. The sulfide SE may belong to, for example, a glass ceramic type or may belong to an argyrodite type. The sulfide SE may contain, for example, Li, P, and S. The sulfide SE may include, for example, at least one selected from the group consisting of $LiI—LiBr—Li_3PS_4$, $Li_2S—SiS_2$, $LiI—Li_2S—SiS_2$, $LiI—Li_2S—P_2S_5$, $LiI—Li_2O—Li_2S—P_2S_5$, $LiI—Li_2S—P_2O_5$, $LiI—Li_3PO_4—P_2S_5$, $Li_2S—GeS_2—P_2S_5$, $Li_2S—P_2S_5$, $Li_4P_2S_6$, $Li_7P_3S_{11}$, and $Li_3PS_4$.

For example, "$LiI—LiBr—Li_3PS_4$" indicates a sulfide SE generated by mixing LiI, LiBr, and $Li_3PS_4$ in any molar ratio. For example, the sulfide SE may be generated by a mechanochemical method. The molar ratio may be specified by prefixing each raw material ("LiI" or the like) with a number. For example, a case of "10LiI—15LiBr—75$Li_3PS_4$" indicates that mixing is carried out at "LiI/LiBr/$Li_3PS_4$=10/15/75 (molar ratio)".

Electron Conductive Material

The electron conductive material can form an electron conduction path within the active material layer. The blending amount of the electron conductive material may be, for example, 0.1 parts by mass to 10 parts by mass with respect to 100 parts by mass of the composite particles. The electron conductive material may contain, for example, at least one selected from the group consisting of acetylene black (AB), vapor grown carbon fiber (VGCF), carbon nanotube (CNT), and graphene flake (GF).

Binder

The binder can bind the solids to each other. The blending amount of the binder may be, for example, 0.1 parts by mass to 10 parts by mass with respect to 100 parts by mass of the composite particles. The binder may contain, for example, at least one selected from the group consisting of styrene-butadiene rubber (SBR), polyvinylidene fluoride (PVDF), and a vinylidene fluoride-hexafluoropropylene copolymer (PVDF-HFP).

Sample Preparation

No. 1

Preparation of Slurry for Negative Electrode

The following materials were prepared.

Active material: $Li_4Ti_5O_{12}$

IM compound: 1-hydroxyethyl-2-alkenyl imidazoline

Ion conductive material: 10LiI—15LiBr—75$Li_3PS_4$ (D50=0.9 μm)

Electron conductive material: VGCF

Binder: SBR

Dispersion medium: Tetralin

The active material, the IM compound, the ion conductive material, the electron conductive material, the binder, and the dispersion medium were mixed with an ultrasonic homogenizer ("UH-50" manufactured by SMT Co., Ltd.) to prepare a slurry. The blending ratio of the solid content was "active material/IM compound/ion conductive material/electron conductive material/binder=100/1.88/33.6/1.1/0.86 (mass ratio)". The solid content fraction of the slurry was 58%.

Preparation of Composite Particle

"Balance Gran Model BG-25L" manufactured by FREUND-TURBO CORPORATION was prepared. In the same apparatus, a mixture of 95.4 parts by volume of a positive electrode active material ($LiNi_{0.8}Co_{0.15}Al_{0.05}O_2$) and 4.6 parts by volume of a fluoride SE ($Li_{2.7}Ti_{0.3}Al_{0.7}F_6$) was subjected to a composite treatment to form composite particles. Treatment conditions were as follows.

Stirring speed: 1,150 rpm

Treatment time: 1 hour

Preparation of Slurry for Positive Electrode

The following materials were prepared.

IM compound: 1-hydroxyethyl-2-alkenyl imidazoline

Ion conductive material: 10LiI—15LiBr—75$Li_3PS_4$ (D50=0.9 μm)

Electron conductive material: VGCF, AB

Binder: SBR

Dispersion medium: Tetralin

The composite particle, the IM compound, the ion conductive material, the electron conductive material, the binder, and the dispersion medium were mixed with an ultrasonic homogenizer to prepare a slurry. The blending ratio of the solid content was "composite particle/IM compound/ion conductive material/VGCF/AB/binder=100/0.05/32.38/3.11/0.308/0.431 (mass ratio)". The solid content fraction of the slurry was 66.5%.

Preparation of Slurry for Separator

The following materials were prepared.

Ion conductive material: LiI—LiBr—$Li_2S$—$P_2S_5$ (glass ceramic type, D50=2.5 μm)

Binder solution: SBR (mass fraction: 5%) as a solute, heptane as a solvent

Dispersion medium: heptane

The ion conductive material, the binder solution, and the dispersion medium were mixed in a container made of polypropylene, for 30 seconds with an ultrasonic homogenizer. After mixing, the container was set in a shaker. The container was shaken in a shaker for 3 minutes to prepare a slurry.

Production of Power Generation Element

The slurry for a positive electrode was applied onto the surface of a base material (an Al foil, thickness: 15 μm) with a blade type applicator. After the application, the slurry was dried on a hot plate (set temperature: 100° C.) for 30 minutes to form an active material layer. That is, a positive electrode was formed.

The slurry for a negative electrode was applied onto the surface of a base material (a Ni foil, thickness: 22 μm) with a blade type applicator. After the application, the slurry was dried on a hot plate (set temperature: 100° C.) for 30 minutes to form an active material layer. That is, a negative electrode was formed. The weight per unit area for coating the negative electrode was adjusted such that the ratio of the specific charging capacity of the negative electrode to the specific charging capacity (200 mAh/g) of the positive electrode was 1.0.

The positive electrode was subjected to press processing. After the press processing, the slurry for a separator was applied onto the surface of the positive electrode with a die coater. After the application, the slurry was dried on a hot plate (set temperature: 100° C.) for 30 minutes to form a separator layer. A first unit was prepared as described above. The first unit was subjected to press processing with a roll pressing device. The linear pressure was 2 tons/cm.

The negative electrode was subjected to press processing. After the press processing, the slurry for a separator was applied onto the surface of the negative electrode with a die coater. After the application, the slurry was dried on a hot plate (set temperature: 100° C.) for 30 minutes to form a separator layer. A second unit was prepared as described above. The second unit was subjected to press processing with a roll pressing device. The linear pressure was 2 tons/cm.

The slurry for a separator was applied onto the surface of a temporary support (a metal foil). After the application, the slurry was dried on a hot plate (set temperature: 100° C.) for 30 minutes to form a separator layer.

The separator layer on the temporary support was transferred to the surface of the first unit. The planar shapes of the first unit and the second unit were adjusted by punching processing. The first unit and the second unit were laminated such that the separator layer of the first unit faced the separator layer of the second unit. This lamination allowed the formation of a power generation element. The power generation element was subjected to hot press processing with a roll pressing device. The press temperature was 160° C. The linear pressure was 2 tons/cm.

Production of all-Solid State Battery

An exterior body (a pouch made of an Al laminated film) was prepared. The power generation element was enclosed in the exterior body. A restraining member was prepared. The restraining member was attached to the outside of the exterior body such that a pressure of 5 MPa was applied to the power generation element. An all-solid state battery was manufactured as described above.

Nos. 2 to 5

An electrode and an all-solid state battery were manufactured in the same manner as in No. 1, except that in "Preparation of Slurry for Positive Electrode", the blending amount of the IM compound was changed as shown in Table 1 below.

No. 6

An electrode and an all-solid state battery were manufactured in the same manner as in No. 1, except that in "Preparation of Composite Particle", the composite particles were formed with "Nobilta Model NOB-MINI" manufactured by Hosokawa Micron Corporation. Treatment conditions were as follows.

Clearance between casing and rotor: 2 mm

Rotation speed: 6, 100 rpm

Treatment time: 30 minutes

Evaluation

The state of charge (SOC) of the all-solid state battery was adjusted to 80%. The all-solid state battery was discharged for two seconds at a time rate of 46.4 C in a constant temperature bath (set temperature: 25° C.). The initial resistance was determined from the amount of voltage drop during discharge and the current. It is noted that "C" is a symbol indicating the time rate (rate) of the current. At a time rate of 1 C, the rated capacity of the battery is discharged in one hour. After measuring the initial resistance, an endurance test was carried out. That is, a high-temperature storage test was carried out under the following conditions.

Test temperature: 60° C.

SOC at the start of storage: 80%

Storage time: 168 hours

After the endurance test, the post-endurance resistance was measured in the same manner as the initial resistance. The resistance increase rate was determined by dividing the post-endurance resistance by the initial resistance.

TABLE 1

| No. | IM compound [parts by mass] | Apparatus for composite treatment — | BET ratio [%] | Resistance increase rate [%] |
|---|---|---|---|---|
| 4 | 0 | BALANCE GRAN | 179 | 125 |
| 1 | 0.05 | BALANCE GRAN | 179 | 105 |
| 2 | 0.103 | BALANCE GRAN | 179 | 117 |
| 3 | 0.2 | BALANCE GRAN | 179 | 120 |
| 5 | 0.5 | BALANCE GRAN | 179 | 132 |

In Table 1, it can be seen that the resistance increase rate tends to be low in the range where the blending amount of the IM compound is more than 0 parts by mass and parts by mass or less with respect to 100 parts by mass of the composite particles. In a range in which the blending amount of the IM compound is 0.05 parts by mass to 0.1 parts by mass, it can be seen that the resistance increase rate tends to be further reduced.

TABLE 2

| No. | IM compound [parts by mass] | Apparatus for composite treatment — | BET ratio [%] | Resistance increase rate [%] |
|---|---|---|---|---|
| 1 | 0.103 | BALANCE GRAN | 179 | 117 |
| 6 | 0.103 | Nobilta | 116 | 121 |

In Table 2, it can be seen that there is a tendency that the higher the BET ratio after the composite treatment, the lower the resistance increase rate.

What is claimed is:

1. An electrode for an all-solid state battery, comprising:
composite particles of 100 parts by mass; and
an imidazoline-based compound of more than 0 parts by mass and 0.3 parts by mass or less, wherein:
the composite particle includes a core particle and a coating layer;
the coating layer covers at least a part of a surface of the core particle;
the core particle contains an active material;
the coating layer contains a fluoride solid electrolyte; and
the fluoride solid electrolyte contains at least one selected from the group consisting of Ca, Mg, Al, Y, Ti and Zr.

2. The electrode for an all-solid state battery according to claim 1, wherein the electrode contains the composite particles of 100 parts by mass and the imidazoline-based compound of 0.05 parts by mass to 0.1 parts by mass.

3. The electrode for an all-solid state battery according to claim 1, further comprising a sulfide solid electrolyte of 10 parts by mass to 100 parts by mass.

4. The electrode for an all-solid state battery according to claim 1, wherein that the imidazoline-based compound is represented by Formula (1):

(1)

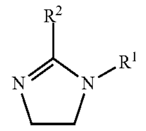

in Formula (1),
$R^1$ is an alkyl group or a hydroxyalkyl group and has 1 to 22 carbon atoms, and
$R^2$ is an alkyl group or an alkenyl group and has 10 to 22 carbon atoms.

5. The electrode for an all-solid state battery according to claim 1, wherein the fluoride solid electrolyte is represented by Formula (2):

$$Li_{3-x}Ti_xAl_{1-x}F_6 \quad (2)$$

in Formula (2), x satisfies $0 \le x \le 1$.

6. The electrode for an all-solid state battery according to claim 1, wherein a ratio of a specific surface area of the composite particle to a specific surface area of the core particle is more than 1.07 and 3.27 or less.

7. The electrode for an all-solid state battery according to claim 1, wherein the fluoride solid electrolyte further contains Li and F.

* * * * *